US012608544B2

(12) United States Patent
Tu et al.

(10) Patent No.: US 12,608,544 B2
(45) Date of Patent: Apr. 21, 2026

(54) SYSTEM AND METHOD FOR AUTOMATIC LANGUAGE DETECTION FOR HANDWRITTEN TEXT

(71) Applicant: Microsoft Technology Licensing, LLC, Redmond, WA (US)

(72) Inventors: Xiao Tu, Medina, WA (US); Zhe Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2123 days.

(21) Appl. No.: 15/991,383

(22) Filed: May 29, 2018

(65) Prior Publication Data

US 2019/0370324 A1 Dec. 5, 2019

(51) Int. Cl.
*G06F 40/263* (2020.01)
*G06F 3/0354* (2013.01)
(Continued)

(52) U.S. Cl.
CPC ........ *G06F 40/263* (2020.01); *G06F 3/03545* (2013.01); *G06N 5/042* (2013.01);
(Continued)

(58) Field of Classification Search
CPC .......... G06N 20/00; G06N 3/08; G06N 5/046; G06N 7/005; G06N 3/0445; G06N 3/0454;
(Continued)

(56) References Cited

U.S. PATENT DOCUMENTS 8,812,295 B1 * 8/2014 Swerdlow ............. G06F 40/263
704/277
2007/0133877 A1 6/2007 Wang et al.
(Continued)

FOREIGN PATENT DOCUMENTS

CN 107969155 A 4/2022

OTHER PUBLICATIONS

Sun et al., Deep LSTM Networks for Online Chinese Handwriting Recognition, 2016, 2016 15th International Conference on Frontiers in Handwriting Recognition, pp. 271-276 (Year: 2016).*
(Continued)

*Primary Examiner* — David Yi

(57) ABSTRACT

Methods for automatic language detection for handwritten text are performed by systems and devices. Such automatic language detection is performed prior to sending representations of the handwritten text to a language recognition
(Continued)

engine. Handwritten inputs including one or more writing strokes are received from an input interface, and are associated with coordinates of the inputs and times that the inputs are made. The handwritten inputs are grouped into words based on the coordinates and times. Writing strokes are normalized, and then the words are individually transformed to generate language vectors, such as through a recurrent neural network. The language vectors are used to determine language probabilities for the handwritten inputs. Based on the language probabilities, the handwritten inputs are provided to a specific language recognition engine to determine the language thereof prior to translation or transcription.

20 Claims, 6 Drawing Sheets

(51) Int. Cl.
| | |
|---|---|
| *G06N 5/04* | (2023.01) |
| *G06N 5/046* | (2023.01) |
| *G06V 30/142* | (2022.01) |
| *G06V 30/246* | (2022.01) |

(52) U.S. Cl.
CPC ......... *G06N 5/046* (2013.01); *G06V 30/1423* (2022.01); *G06V 30/246* (2022.01)

(58) Field of Classification Search
CPC .......... G06N 20/20; G06N 3/04; G06N 5/003; G06N 20/10; G06N 3/00; G06N 3/0427; G06N 3/084; G06N 5/006; G06N 5/022; G06N 5/025; G06N 5/04
See application file for complete search history.

(56) References Cited

U.S. PATENT DOCUMENTS

| | | | |
|---|---|---|---|
| 2014/0363074 A1* | 12/2014 | Dolfing | G06F 40/129 |
| | | | 382/161 |
| 2017/0068868 A1 | 3/2017 | Carbune et al. | |
| 2018/0107650 A1 | 4/2018 | Calvo et al. | |

OTHER PUBLICATIONS

Barlas, et al., "Language Identification in Document Images", In Journal of Imaging Science and Technology, vol. 60, Issue 1, Jan. 2016, 16 Pages.
Carbune, et al., "Fast Multi-language LSTM-based Online Handwriting Recognition", In the Repository of arXiv:1902.10525v1, Feb. 22, 2019, 13 Pages.
"International Search Report and Written Opinion Issued in PCT Application No. PCT/US19/031925", Mailed Date: Sep. 5, 2019, 10 Pages.
"Notice of Allowance Issued in European Patent Application No. 19733187.9", Mailed Date: Apr. 26, 2022, 2 Pages.
"Office Action Issued in Indian Patent Application No. 202047050287", Mailed Date: Sep. 2, 2022, 6 Pages.
Communication Under Rule 71 (3) EPC Received for European Application No. 19733187.9, mailed on Dec. 9, 2021, 7 Pages.
First Office Action received for Chinese Application No. 201980036282.1, mailed on Sep. 22, 2023, 20 pages (English Translation Provided).
Intimation of Grant Received for Indian Application No. 202047050287, Mailed on May 14, 2024, 1 Pages.
Lian-Wen et al., "Applications of Deep Learning for Handwritten Chinese Character Recognition: A Review", Sun Jun. Journal of Automation, vol. 42, Issue 8, Aug. 2016, 17 pages.
Notification to Grant Patent Right for Invention Received in Chinese Patent Application No. 201980036282.1, mailed on Feb. 29, 2024, 4 pages. (English Translation provided).

\* cited by examiner

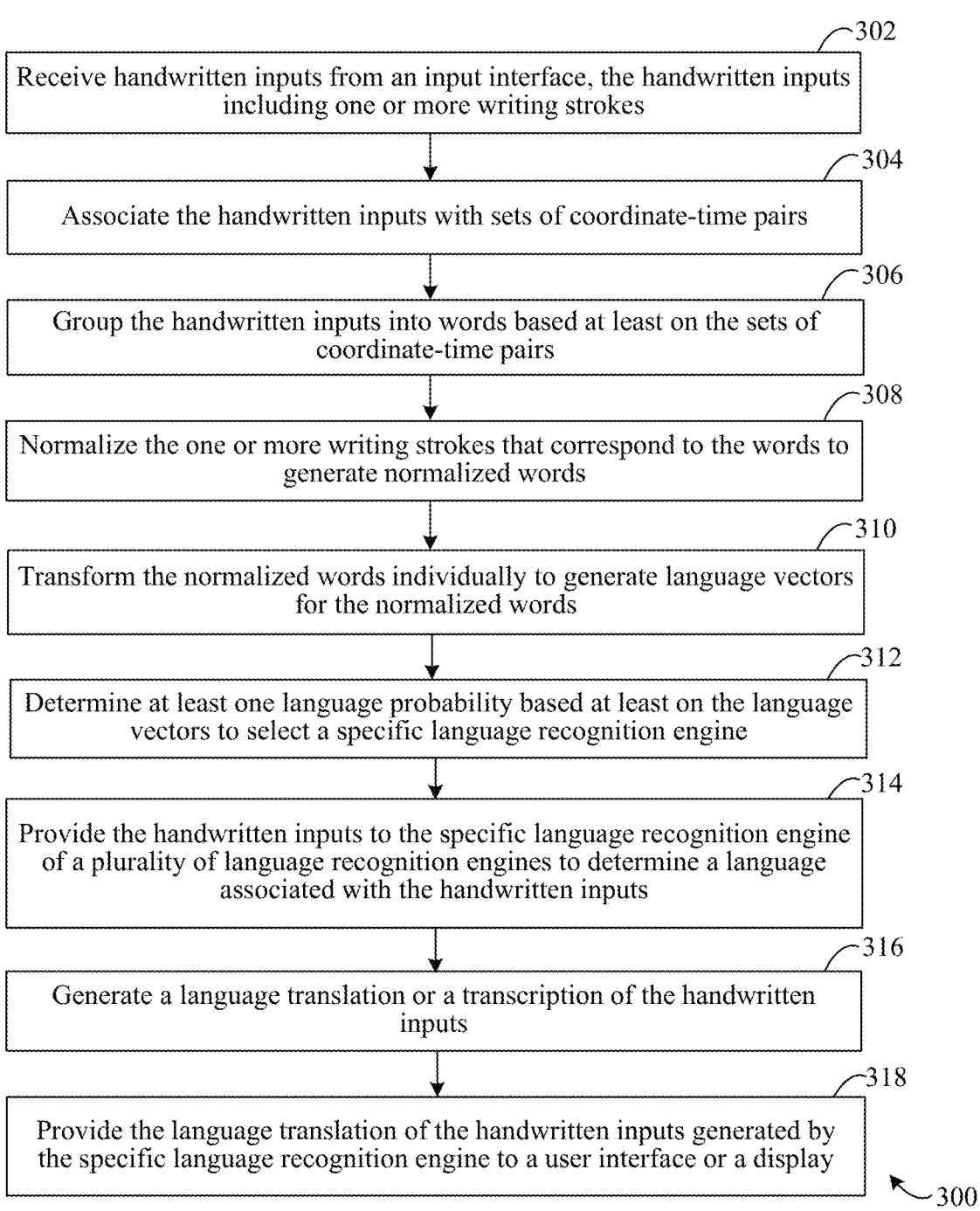

302

Receive handwritten inputs from an input interface, the handwritten inputs including one or more writing strokes

304

Associate the handwritten inputs with sets of coordinate-time pairs

306

Group the handwritten inputs into words based at least on the sets of coordinate-time pairs

308

Normalize the one or more writing strokes that correspond to the words to generate normalized words

310

Transform the normalized words individually to generate language vectors for the normalized words

312

Determine at least one language probability based at least on the language vectors to select a specific language recognition engine

314

Provide the handwritten inputs to the specific language recognition engine of a plurality of language recognition engines to determine a language associated with the handwritten inputs

316

Generate a language translation or a transcription of the handwritten inputs

318

Provide the language translation of the handwritten inputs generated by the specific language recognition engine to a user interface or a display

SYSTEM AND METHOD FOR AUTOMATIC LANGUAGE DETECTION FOR HANDWRITTEN TEXT

BACKGROUND

Handwriting recognition systems allow for a user to input handwritten text that may then be transformed or translated into typed text. Current handwriting input systems require users to explicitly download and enable language packs to perform these functions. During operation, a user explicitly informs the system of which language in being input. Some current online translation systems provide the strokes of handwritten text into all available language recognizers simultaneously. Each language recognizer then generates a list of candidates and corresponding confidence scores for inputs. In such cases, suggestion panels for possible results include results from different languages that are mixed together when provided to the user. Calling all language recognizers simultaneously is resource consuming (e.g., for processor, memory, power, etc.) and unsuitable for client-side applications. Furthermore, calibrating confidence scores from each recognizer in a way to meaningfully pick the correct results is complex and difficult, and such an approach does not scale with the number of languages involved. Typically, such language recognizers produce results/suggestions in multiple different languages mixed together in the suggestion panel.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for automatic language detection for handwritten text are performed by systems and devices. The automatic language detection may be performed prior to sending representations of the handwritten text to a language recognition engine. The automatic language detection reduces performance penalties for text translation by determining a specific language recognition engine for a translation, instead of translating text using multiple engines for a translation. Accordingly, techniques are provided herein for efficient performance of automatic language detection for handwritten text and translations or transcription thereof.

For instance, handwritten text inputs, that may include one or more writing strokes, are received from an input interface. The handwritten text inputs are associated with coordinates of the inputs, and times that the inputs are made. The handwritten inputs are grouped into words based at least on the coordinates and times. Writing strokes are normalized, and then the words are transformed, individually, to generate language vectors, such as through a recurrent neural network (RNN) or bi-directional RNN. The language vectors are used to determine language probabilities for the handwritten inputs. Based at least on the language probabilities, the handwritten inputs are provided to a specific language recognition engine to determine the language for the handwritten inputs prior to their attempted translation or transcription. Symbols present in some languages may also be used in language determinations.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a flowchart for performing automatic language detection for handwritten text, in accordance with an example embodiment.

Figure 1:
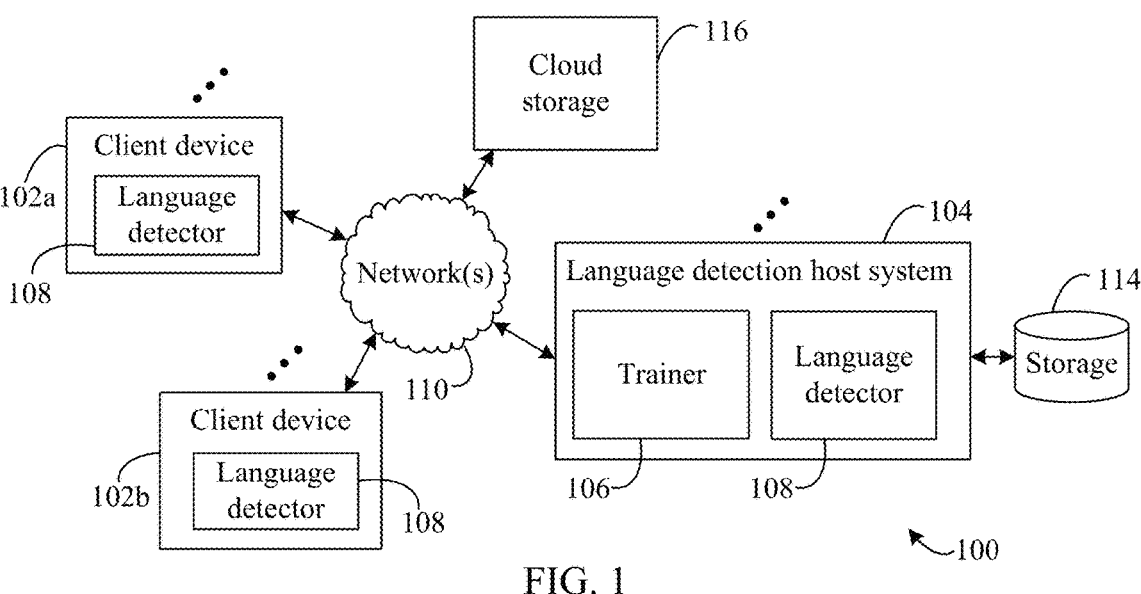
FIG. 1 shows a block diagram of a networked system that includes language detectors for performing automatic language detection for handwritten text, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for performing automatic language detection for handwritten text, where Section II.A describes example embodiments for systems and devices that automatically detect languages for handwritten text, and Section MB describes example embodiments for algorithms and recurrent neural networks utilized. Section III below describes mobile and computing device embodiments that may be used to implement features of the embodiments described herein. Section IV below describes additional examples and advantages, and Section V provides some concluding remarks.

II. Example Embodiments

Methods, systems, and devices are provided for performing automatic language detection for handwritten text. The disclosed embodiments provide for automatic language detection that may be performed prior to sending representations of the handwritten text to a language recognition engine to reduce performance penalties for text translations. That is, by determining a specific language recognition engine to be utilized prior to text translation, instead of translating text across multiple engines for each translation, resource utilization (e.g., memory, processor, power, network bandwidth, etc.) is greatly reduced. Accordingly, techniques are provided herein for efficient performance of automatic language detection for handwritten text and its translation that allows implementations to be utilized on client and edge devices. Simply put, performing the described automatic language detection is not resource intensive, unlike previous solutions, through the pre-determination of languages for handwritten text, and thus does not require a resource-heavy server/cloud host to perform its functions. It is contemplated herein that any types of languages may be determined from handwritten text in accordance with the disclosed embodiments.

In an embodiment, a language determination is made, word by word, prior to selecting a language recognition engine and attempting translations of handwritten text. That is, a soft decision is made, based at least on the handwritten text inputs, such that a single or specific language recognition engine may be run to recognize the inputs. For instance, an input analyzer may be invoked to group strokes of handwritten text inputs into words and to classify the inputs as writings versus drawings. Groups of strokes may be determined as words based at least on coordinates of the strokes with respect to the input interface and each other, and the time at which the strokes are made with respect to each other.

The inputs, as words, may be provided to a language-generic engine (i.e., an engine that is not language dependent) to detect indicia of the language for the handwritten text inputs before they are sent to a specific language recognizer. The generic engine may include various components such as, but not limited to, a featurizer, a recurrent neural network (RNN), a soft decision engine, etc. The featurizer may normalize the strokes of the grouped word inputs and then sample the normalized strokes to determine their characteristics. The RNN takes featurized inputs and generates output vectors. The RNN may implement gated recurrent units (GRUs) or long short-term memory (LSTM) units, in embodiments, and may be single- or bi-directional. The output vectors of the RNN are provided to the soft decision engine to generate language probabilities for the handwritten text.

Subsequently, a specific language recognition engine may be identified and selected. The handwritten text inputs may be provided to the identified specific language recognition engine for a final determination of the language, enabling the handwritten text inputs to be translated by a single translation tool. As words are translated or transcribed, they may be provided via a UI on a display device for viewing and/or selection by a user. Additionally, a user's notes may be tagged or otherwise identified by language upon detection/recognition.

While some embodiments are described for illustration herein with respect to real-time handwritten text inputs, the embodiments are not so limited. For example, handwritten may be stored in a file that is subsequently (at any time) provided for automatic language detection as described herein.

These and further embodiments are described in greater detail as follows.

A. Example Embodiments for Systems and Devices that Automatically Detect Languages for Handwritten Text In embodiments, systems and devices may be configured in various ways for automatically detecting languages for handwritten text. For instance, FIG. 1 is a block diagram of a networked system 100 ("system 100") including language detectors for performing automatic language detection for handwritten text, according to embodiments. As shown in FIG. 1, system 100 includes a client device 102a, a client device 102b, a language detection host system 104, storage 114, and a cloud storage system 116 which may communicate with each other over a network 110. It should be noted that any numbers of client devices, host systems, and/or cloud storage systems may be present in various embodiments. Additionally, any combination of the components illustrated in FIG. 1 may be present in system 100, according to embodiments.

As noted above, client device 102a, client device 102b, language detection host system 104, and cloud storage system 116, are communicatively coupled via network 110.

Network 110 may comprise any type of communication links that connect computing devices and servers such as, but not limited to, the Internet, wired or wireless networks and portions thereof, point-to-point connections, local area networks, enterprise networks, and/or the like.

Cloud storage system 116 may comprise one or more server computers or computing devices, which may include one or more distributed or "cloud-based" servers, or any other type of computing device that manage storage devices, as described herein. Such storage devices may include any type of physical hardware storage, and may comprise mass storage racks, clusters, datacenters, etc. Cloud storage system 116 may include portions of different topologies and/or geographical locations. Cloud storage system 116 may store language sets used for training of RNNs and/or language translations, or other language-related functions described herein.

Language detection host system 104 may comprise one or more server computers or computing devices, which may include one or more distributed or "cloud-based" servers. Language detection host system 104 may include internal or external storage, which may be distributed, such as but not limited to, storage 114. Language detection host system 104 is configured to train RNN models for different languages using a trainer 106, and is also configured to automatically detect languages for handwritten text using a language detector 108. In embodiments, language detection host system 104 may be configured to store language sets. It is contemplated herein that any number of language sets may be stored and/or managed by language detection host system 104. Remote databases or storage, such as storage 114, communicatively connected via network 110 or otherwise, may be utilized as part of language detection host system 104 and used for such storage.

In one example, language detection host system 104 is a "cloud" platform/architecture for hosting a dataset to be managed according to the embodiments herein. A cloud platform/architecture may include a networked set of computing resources, including servers, routers, etc., that are configurable, shareable, provide data security, and are accessible over a network such as the Internet. Trainer 106 and language detector 108 may thus be cloud utilities/applications run on the resources, atop or within operating systems that run on the resources, for entities that access the applications over the network, as well as for language detection host system 104 itself. A cloud platform may support multitenancy, where cloud platform-based software, such as work service 108, services multiple tenants, with each tenant including one or more users who share common access to software services of the cloud platform. Furthermore, a cloud platform may support hypervisors implemented as hardware, software, and/or firmware that run virtual machines (emulated computer systems, including operating systems). A hypervisor presents a virtual operating platform that may be used according to the disclosed embodiments.

Trainer 106 is configured to train RNN models for language detection used for identifying languages associated with handwritten text. For example, trainer 106 is configured to perform offline training on language sets, of any language, to build language-specific models for RNN implementations in language detector 108, described below. It is contemplated herein that various forms of training may be used with trainer 106 to generate the language-specific models for RNN implementations. Models may be stored by language detection host system 104 in ways described herein and/or may be provided to client device 102a/client device 102b for storage and use thereby.

As illustrated, client device 102a, client device 102b, and language detection host system 104 also include an instance of language detector 108. Language detector 108 is configured in various ways for automatically detecting languages for handwritten text. For instance, language detector 108 is configured to perform automatic language detection prior to sending representations of the handwritten text to a language recognition engine. As described herein, handwritten text inputs may include one or more writing strokes. Language detector 108 is configured to determine words from the writing strokes based at least on coordinates and time stamps of the writing strokes. Language detector 108 is also configured to normalize the writing strokes and transform the words individually to generate language vectors, e.g., via a RNN. Language detector 108 is configured to utilize the language vectors and determine language probabilities for the handwritten inputs which may then be used to select a specific language recognition engine to determine the language for the handwritten inputs prior to their attempted translation. Further details regarding language detectors are provided below.

Client device 102a and client device 102b may be any type of computing device or computing system, a terminal, a personal computer, a laptop computer, a tablet device, a smart phone, a gaming console, a vehicle, an IoT device, etc., that may be used, e.g., by users, to automatically detect languages for handwriting text inputs, as described herein. A user of client device 102a and/or client device 102ba may provide handwritten text inputs via one or more user interfaces (UIs) and/or input devices (not shown, but described in further detail below). Such UIs and/or input devices may be a specifically associated with handwritten text inputs, or may be standard types from which handwritten inputs may be derived (e.g., touchscreens).

Figure 2:
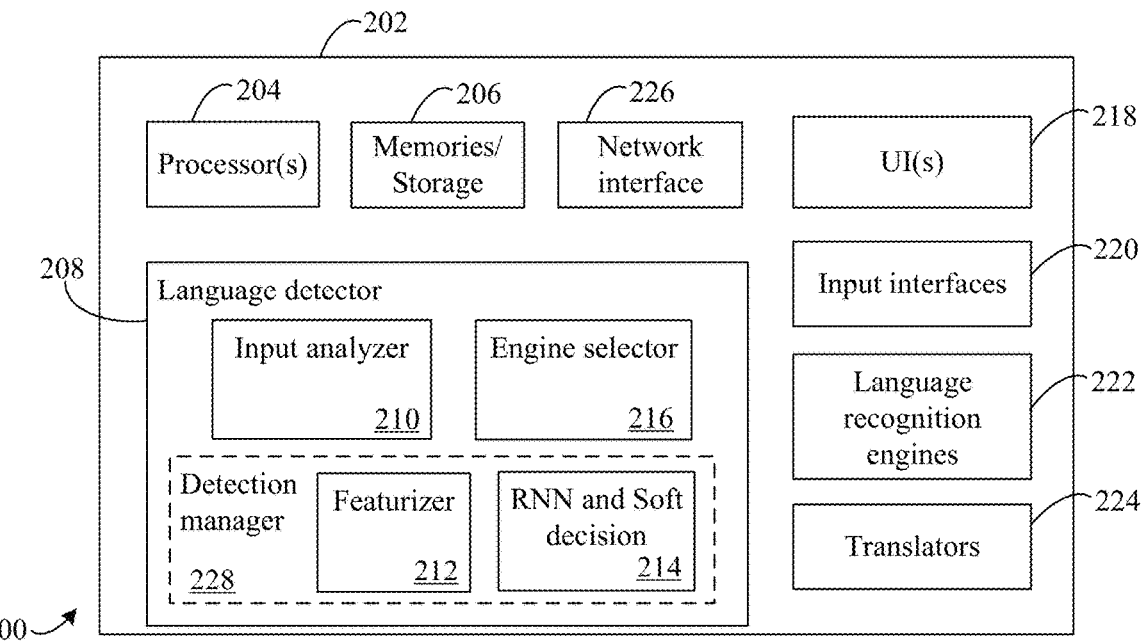
FIG. 2 shows a block diagram of a language detection system for performing automatic language detection for handwritten text, according to an example embodiment.

Note that as described herein, embodiments are applicable to any language or dialect that is trained into a RNN model. Accordingly, language detection host system 104, device 102a, and client device 102b may be configured in various ways to perform automatic language detection for handwritten text. For example, FIG. 2 is a block diagram of a language detection system 200 ("system 200" herein) configured to perform automatic language detecting for handwritten text. System 200 may be an embodiment of language detection host system 104, device 102a, and/or client device 102b of FIG. 1. System 200 is described as follows.

System 200 includes a computing device 202, which may be any type of server computer or computing device, as mentioned elsewhere herein, or as otherwise known, including cloud-based server implementations, distributed implementations, etc. As shown in FIG. 2, system 200 and computing device 202 include one or more of a processor ("processor") 204, one or more of a memory and/or other physical storage device ("memory") 206, one or more network interfaces ("network interface") 226, and a language detector 208 that may be an embodiment of language detector 108 of FIG. 1. System 200 also includes UIs 218, input interfaces 220, language recognition engines 222, and translators 224. System 200 may also include additional components (not shown for brevity and illustrative clarity) including, but not limited to, components and subcomponents of other systems herein, and, such as an external storage (e.g., storage 114 of FIG. 1), etc., as well as those described below with respect to FIGS. 9 and 10, such as an operating system, a display, etc.

Processor 204 and memory 206 may respectively be any type of processor circuit or memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. For instance, one or more of processor 204 may comprise a processing system. Processor 204 comprises circuitry that is configured to execute computer program instructions such as but not limited to embodiments of language detector 208, UIs 218, language recognition engines 222, and/or translators 224, which may be implemented as computer program instructions for performing automatic language detection for handwritten text, as described herein. Memory 206 is configured to store such computer program instructions/code, as well as to store other information and data described in this disclosure including, without limitation, language sets, RNN models, etc. In some embodiments, storage 114 of FIG. 1 may also be included in system 200, e.g., as a portion of memory 206, as a persistent, non-volatile storage. Note that in other embodiments, language detector 208, language recognition engines 222, and/or translators 224 may alternatively be implemented in hardware, such as electrical circuits comprised of transistors, logic gates, operational amplifiers, one or more application specific integrated circuits (ASICs), one or more field programmable gate arrays (FPGAs), and/or other hardware.

Network interface 226 may be any type of wired and/or wireless network adapter, modem, etc., configured to enable system 200 to communicate with other systems/devices over a network, such as communications between system 200 and other systems/devices utilized in a network like network 110 as described herein, e.g., those described above with respect to FIG. 1 and system 100.

UIs 218 may be any type of user interface, and may be included in or with an operating system of computing device 202. UIs 218 may be specifically associated with handwritten text inputs, or may be standard types of UIs from which handwritten inputs may be derived (e.g., touchscreens). UIs 218 are configured to enable users to interact with computing device 202 for the purposes of providing handwritten text inputs and/or displaying language recognition outputs, including translations, transcriptions, etc. Additionally, the described embodiments provide for improvements to UIs 218 through improvements in language detection for handwritten text. For instance, as noted above, current systems have limitations for handwritten text recognition including calling all language recognizers simultaneously which is resource consuming and unsuitable for client-side applications. The embodiments herein provide for the ability to call a single, specific language recognizer, while at the same time decluttering the UI by providing specific word by word results in one language, rather than showing results or suggestions that include different languages mixed together in the suggestion panel, often in many languages, which is confusing and undesirable to the user Input interfaces 220 are configured to enable users to enter handwritten text inputs to computing device 202. In embodiments, input interfaces 220 may include touch pads, touch screens, displays, tablets, cameras, motion detectors, and/or the like that are configured to recognize handwritten text from the user and provide indicia/representations thereof to language detector 208 of computing device 202. Input interfaces 220 may also comprise a portion of network interface 226 to receive a file with handwritten text from across a network, or may comprise other computer hardware to receive such a file, or data, from memory 206. Such files or data may be generated using input interfaces 220 that allow for direct user interaction which is saved, or may be a file/data generated from a camera (video or image) or scanner from a hardcopy source on which the user, or others, has/have written.

Language recognition engines 222 may be any type of language recognition engine that is configured to determine or predict a language based at least on received inputs. One or more instances of language recognition engines 222 may be present in embodiments, and any number of languages may be determined by one or more instances of language recognition engines 222. In embodiments, a single, specific one of language recognition engines 222 is called or executed at a time for a given word of handwritten text inputs.

Translators 224 may be any type of language translator or transcriber that is configured to translate or transcribe handwritten text based at least on received inputs. For instance, translators 224 may be configured to translate handwritten text inputs in the Chinese language to the English language. Additionally, translators 224 may be configured to transcribe handwritten text inputs (e.g., in Chinese, English, etc.) into electronic representations thereof. For example, handwritten text of a user may be transcribed to a file or display in a font that is easily read by other, that is searchable, etc. One or more instances of translators 224 may be present in embodiments, and any number of languages may be translated/transcribed by one or more instances of translators 224. In some embodiments, translators 224 may reside at language detection host system 104 and/or in the cloud.

Language detector 208 includes a plurality of components for performing the automatic language detection for handwritten text described herein. As shown, language detector 208 includes an input analyzer 210, a featurizer 212, an RNN and soft decision engine 214, and an engine selector 216. While shown separately for illustrative clarity, in embodiments, one or more of input analyzer 210, featurizer 212, RNN and soft decision engine 214, and/or engine selector 216, may be combined together and/or as a part of other components of system 200. For instance, featurizer 212 and RNN and soft decision engine 214 may form at least part of a detection manager 228. In some embodiments, less than all of the components of language detector 208 illustrated in FIG. 2 may be included. In an embodiment, one or more components of language detector 208 and/or computing device 202 may be stored in memory 206 and may be executed by processor 204.

Input analyzer 210 is configured to receive handwritten text inputs, or representations thereof, and to determine words based at least on strokes of the handwritten text. Featurizer 212 is configured to sample and normalize the strokes of words. RNN and soft decision engine 214 is configured to transform the normalized words individually to generate vectors used to determine language probabilities. Engine selector 216 is configured to call or activate a specific language recognition engine based at least on the probabilities.

Additionally, a user's notes may be tagged or otherwise identified according to language by language detector 208 and/or one of language recognition engines 222 upon detection/recognition of the language. Such tags or identifiers may be displayed to the user in proximity to the handwritten notes on the user interface, and/or may be persistently stored, e.g., in a file with a representation of the handwritten notes. Further details regarding language detector 208 and its components are described below.

Accordingly, language detector 208 may operate in various ways to perform automatic language detection for handwritten text. For instance, FIG. 3 shows a flowchart 300 for performing automatic language detection for handwritten text, according to an example embodiment. Language detector 208 may operate according to flowchart 300. Further structural and operational examples will be apparent to persons skilled in the relevant art(s) based at least on the following description. Flowchart 300 is described as follows with respect to system 100 of FIG. 1 and system 200 of FIG. 2.

Flowchart 300 begins at step 302. In step 302, handwritten inputs are received from an input interface, the handwritten inputs including one or more writing strokes. For example, a UI of UIs 218 may be displayed in association with one of input interfaces 220. A user may interact with input interfaces 220 to make handwritten text representations thereon, which are captured and provided to language detector 208. In embodiments, input interfaces 220 and/or input analyzer 210 are configured to track a stroke of a handwritten text input as beginning when the user starts a motion and as ending when the user stops the motion and removes or disengages the object used to write from input interfaces 220. This may be referred to as tracking from "pen down to pen up," and applies to handwritten text made with traditional writing instruments, a stylus, a light pen, a finger of the user, and/or the like. Input interfaces 220 may provide handwritten text inputs to language detector 208 in real-time or approximately real-time, on a per stroke basis, a per word basis, a per line, bases, a per paragraph basis, at specified time intervals, and/or the like.

In examples, handwritten text may be captured by camera (video or image), scanner, and/or the like. Video of captured handwritten text may be handled in a similar manner as described above in this step (302), while still images of handwritten text may be handled without the use of time for strokes as noted below.

In step 304, the handwritten inputs are associated with sets of coordinate-time pairs. For example, the handwritten text inputs received in step 302 are associated with sets of coordinates related to the input interface and the times the strokes of the handwritten text inputs were made. As noted above, input interfaces 220 may have coordinates (e.g., x-axis/y-axis), such as coordinates associated with an array of pixel and/or touch sensor locations (e.g., of a capacitive touchscreen). Input interfaces 220 and/or input analyzer 210 are configured to track strokes of the handwritten inputs and note the coordinates where, and times when, the strokes are made. During the course of a stroke, any number of coordinates and related times (i.e., a coordinate-time pair) may be tracked and associated in step 304. This coordinate-time pair information may be stored with the handwritten text inputs.

In a still image capture of handwritten text, time for strokes may be ignored in the coordinate-time pairs, or may be given a null value, or may be given the same value for all coordinate-time pairs. That is, relative coordinates for strokes may be captured from a still image of handwritten text, but it may not be possible to extrapolate temporal attributes without additional information, which could be provided in embodiments by a user. In embodiments where temporal data is not available, coordinates may be used in the following step for grouping words.

In step 306, the handwritten inputs are grouped into words based at least on the sets of coordinate-time pairs. For instance, input analyzer 210 is configured to group handwritten inputs into words. In embodiments, input analyzer 210 forms words based at least on the sets of coordinate-time pairs for the strokes. As an example, a given number of strokes made in a continuous or approximately continuous time period and in close proximity to each other, followed by a delay in input and then another number of strokes may indicate that a word is completed and another word has begun. In other words, spatial and temporal properties and relationships between strokes are used by input analyzer 210 to group strokes into words. Additional details regarding word groupings and spatial/temporal properties is provided below with respect to FIG. 5.

In step 308, the one or more writing strokes that correspond to the words are normalized to generate normalized words. For example, featurizer 212 is configured to sample and normalize strokes of the words grouped in step 306. In embodiments, strokes may be normalized to account for differences in lengths of strokes themselves and/or for differences in lengths of strokes in different words. In this way, strokes and words can be processed consistently regardless of their respective input coordinates. Because short strokes may be difficult to classify, multiple zeros may be padded to the end of short strokes to make the length of each stroke at least a predetermined value. When all strokes of a word are normalized, a normalized word is thus generated.

In step 310, the normalized words are individually transformed to generate language vectors for the normalized words. For instance, RNN and soft decision engine 214 is configured to transform the words normalized in step 308. Each word may be transformed individually using an RNN, e.g., a bi-directional RNN. The featurized/normalized strokes of the words from step 308 are input into the RNN, and the final outputs of two directions of the bi-directional RNN are concatenated to form the RNN output language vector. In an example using GRU cells, only the output of the last time point is kept for the two cells for the RNN, while in other examples, an average to time points may be kept. Further details regarding the RNN described here are provided in the next subsection below.

In step 312, at least one language probability is determined based at least on the language vectors to select a specific language recognition engine. For example, a language vector from step 310 may be provided to a soft decision engine of RNN and soft decision engine 214. The soft decision engine of RNN and soft decision engine 214 is configured to determine the language probability for one or more languages, as related to the handwritten text input, based at least on the language vectors of step 310. The language probability may be a score or value, e.g., between zero and one, that represents the likelihood of a given language corresponding to the handwritten text input. Accordingly, a specific language and corresponding recognition engine are selected based at least on the at least one language probability. Further details regarding the soft decision engine described here are provided in the next subsection below.

In step 314, the handwritten inputs are provided to a specific language recognition engine of a plurality of language recognition engines to determine a language associated with the handwritten inputs. For instance, engine selector 216 is configured to select a single, specific language recognition engine of language recognition engines 222 to recognize the handwritten text inputs. In embodiments, engine selector 216 selects a specific engine based at least on the greatest probability value of the language probability values determined in step 312, or a value of the probability values that exceeds a pre-determined threshold. Engine selector 216 may provide the handwritten text inputs to the selected, specific language recognition engine of language recognition engines 222, and/or may cause the specific language recognition engine to be executed based at least on the selection.

In some embodiments, additional ones of language recognition engines 222 may be selected. For example, when there are no probability values that exceed the pre-determined threshold, or when several language probability values are high, multiple language recognition engines may be invoked. Likewise, for a probability associated with a language that is very similar to other languages, e.g., Latin American languages or language dialects, multiple language recognition engines may be invoked.

In step 316, a language translation or a transcription of the handwritten inputs is generated. For instance, translators 224 are configured to translate and/or transcribe the handwritten text inputs. A translator or a transcriber may be invoked by language detector 208 and/or language recognition engines 222 based at least on the identification of a language for a given handwritten text input in step 314.

In step 318, the language translation or transcription of the handwritten inputs generated by the specific language recognition engine is provided to a user interface or a display. For example, translations and/or transcriptions of words in the handwritten text inputs may be displayed to a user via UIs 218. In embodiments, the translations and/or transcriptions displayed may be selectable for acceptance through UIs 218 by the user. The displayed results may be in a single language, rather than multiple possibilities in different languages, thus improving the user experience and the UI. Additionally, translations and/or transcriptions may be displayed, word-by-word, in real time or approximately real time, as the user enters handwritten text.

It is contemplated herein that other language-specific representations, in addition to words, may be used to determine the language associated with handwritten text inputs. For example, numbers, symbols, punctuation, and/or the like may also be used according to embodiments.

Figure 4:
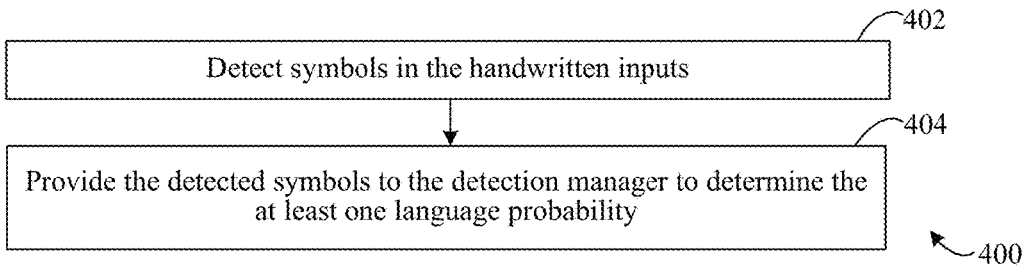
FIG. 4 shows a flowchart for symbol-based automatic language detection for handwritten text, in accordance with an example embodiment.

For instance, FIG. 4 shows a flowchart 400 for performing automatic language detection for handwritten text, according to an example embodiment. Computing device 202 and/or language detector 208 may operate according to flowchart 400. Flowchart 400 may be a further embodiment of flowchart 300 of FIG. 3. Further structural and operational examples will be apparent to persons skilled in the relevant art(s) based on the following description. Flowchart 400 is described as follows with respect to system 200 of FIG. 2 and flowchart 300 of FIG. 3.

Flowchart 400 begins at step 402. In step 402, symbols in the handwritten inputs are detected. For instance, input analyzer 210 may be configured to detect symbols in handwritten text, or numbers, punctuation, etc., that do not correspond to specific words. In some embodiments, input analyzer may include a separate symbol detector to perform such operations. Symbols and/or the like may be determined in a similar manner as words, described above, e.g., in step 304 and step 306 of flowchart 300. Symbols may be specifically associated with one or more languages. As a non-limiting example, a dollar sign '$' may be associated with English or other languages in countries that use the Dollar as a measure of currency, while the Renminbi or Yuan, or the Yen, all '¥', relate to other languages such as Chinese or Mandarin or Japanese. It is contemplated herein that any type of symbol with a relationship to a specific language may be recognized and detected by input analyzer 210.

In step 404, the detected symbols are provided to a detection manager to determine the at least one language probability. For example, a RNN of RNN and soft decision engine 214, e.g., as part of detection manager 228, may be provided with the detected symbols for use in generating language probabilities as similarly described above for words, e.g., in step 310 and step 312 of flowchart 300.

Accordingly, flowchart 300 and flowchart 400 (along with computing system 202 and language detector 208 of system 200) enable the performance of automatic language detection for handwritten text. In this way, performance of computing systems such as user devices are improved by only implementing one, or few, language recognition engines at a time rather than providing handwritten text inputs to all engines simultaneously. By running fewer engines to recognize text, processing, memory, power, and network bandwidth usage is reduced, and non-server devices are thus enabled to determine languages and provide translations/transcriptions for users in real time.

Figure 5:
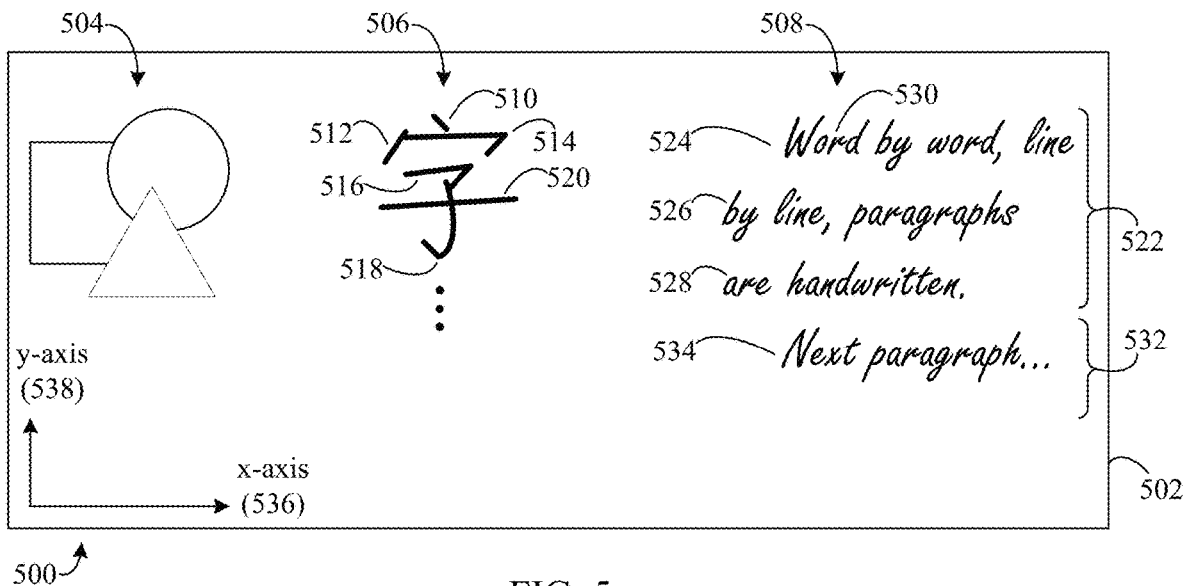
FIG. 5 shows a diagram of an input interface for accepting handwriting strokes, in accordance with example embodiments.

Turning now to FIG. 5, an example diagram of an input interface 500 for accepting handwriting strokes is shown. System 200 may be an embodiment of UIs 218 and/or input interfaces 220 of system 200 in FIG. 2. Input interface 500 is described as follows.

Input interface 500 may include a UI 502 that may be an embodiment of UIs 218 of system 200. That is, in embodiments, input interface 500 may provide input capabilities, or may provide input and output capabilities (e.g., as in a touchscreen example). Also shown in FIG. 5 are a drawing 504, a word 506, and paragraphs 508. It should be noted that the examples shown here are illustrative in nature, and should not be considered limiting.

Regarding drawing 504, a user may draw figures that accompany handwritten text inputs. Input analyzer 210 is configured to distinguish between drawings/figures, and handwritten text such as letters, words, symbols, etc. As in example, a user may draw a circuit diagram that covers a large amount of space, uses several very long strokes, and/or with strokes that take several seconds to make. Similarly, a number of very short, quick strokes may be made. In each case, the amount of time to make strokes, the length of strokes, and the overall area of the strokes may indicate a drawing or non-writing strokes being made. When a drawing or figures such as drawing 504 are detected, any strokes associated therewith may be withheld from further components of language detector 208.

Word 506 depicts a representation of the word "word" or "zì" in Chinese. As illustrated, the strokes used to generate word 506 are provided in numerically ascending order. That is, a stroke 510 is the first stroke, followed by a stroke 512 and a stroke 514. The lower half of the word is formed by a stroke 516, followed by a stroke 518 and finally a stroke 520. As the user makes these strokes via input interface 500, their temporal relationship is determined. Additionally, the coordinates may be represented in Cartesian form as shown with an x-axis 536 and a y-axis 538, although other types of coordinate systems, e.g., polar, spherical, etc., are contemplated. Stroke 510 may begin with a first coordinate identifier (x1, y1) and end with a second coordinate identifier (x2, y2) (i.e., the start and end points of stroke 510). The coordinates are paired with their respective temporal identifiers to generate coordinate-time pairs.

It should be noted, however, that additional coordinates may be determined for any given stroke. For instance, stroke 510 may include any number of additional coordinates to act as sampling points for the stroke. Additional coordinates may be used for curved strokes or strokes that change direction. In some embodiments, a set number of coordinates may be noted for any given stroke, or a coordinate may be used for each length increment of a stroke.

As an example, consider a scenario where subsequent to completing word 506 the user writes the word "play" below word 506. Accordingly, there is a pause between words that may be used to identify a new word being written after word 506 is complete, and also the spatial position (below) word 506 for the new word, including blank space, may be used as indicia of the language being written.

With respect to paragraphs 508, two paragraphs are shown: a first paragraph 522 and a second paragraph 532. First paragraph includes three lines, a first line 524, a second line 526, and a third line 528, made up of words (with a word 530 labeled for brevity and illustrative clarity. Each word shown is made up of strokes. In embodiments, handwritten text may be grouped by paragraph, then by lines, then by words. As shown, word 530 comprising the letters 'W', 'o', 'r', and 'd' is written first, and then the next word "by" is written. In a real-world example for word 530, its letters are written using a number of strokes that are temporally and spatially associated. As there is a space between word 530 and "by," this may indicate, by proximity of the strokes, that these are two separate words. Likewise, the handwritten text in paragraphs 508 flows from left to right, thus additional indicia of the language is determined.

While it is noted herein that real-time, or approximately real-time, language recognition may be performed, the described embodiments also provide for on-demand language detection for handwritten text that is selected by a user after being written (e.g., as one or more paragraphs, one or more lines, one or more words, etc.), including language detection from files that include handwritten text. For example, word 506 and/or paragraphs 508 may be part of an electronically stored file, in some embodiments. In either of such cases, language recognition may be performed word by word as described elsewhere herein, while results may be provided word by word or all at once.

B. Example Embodiments for Algorithms and Recurrent Neural Networks

As described herein, RNNs and soft decision engines may be utilized as part of the automatic language recognition for handwritten text performed by the disclosed embodiments. A basic RNN cell, e.g., a single cell, includes a vector h, indicating a current state of the cell. At each time point t, this cell will take in an input vector x(t), update its state vector h(t), and generate an output vector. Usually the output vector is the state vector h(t), or a transformed version of h(t). The mathematical form for this process may be modeled as:

$$h^{(t)} = f(h^{t-1}, x^{(t)}; \theta),\qquad\text{(Equation 1)}$$

where $\theta$ represents the RNN cell parameters that will be trained by the data, t is time, and f is the activation function, which may be a "tanh" function. In further detail, consider:

$$h_t = \sigma_h(W_h x_t + U_h h_{t-1} + b_h)\qquad\text{(Equation 2)}$$

where Wh and Uh are matrices, bh the bias vector, and σh is the "tanh" function. It should be noted that inside this σh function is a linear transform, which is used to map one vector into another vector or a real value number.

Both LSTM and GRU are described herein for RNN cells, although their inclusion in this description is not limiting. The mathematical form for LSTM and GRU cells is more complex as compared to a basic RNN cell, but LSTM and GRU still follow the form of Equations 1 and 2. LSTM and GRU may be used in embodiments herein to solve the problem that when the input sequence is quite long, the output of the RNN tends to rely heavily on more recent input vectors in the sequence.

Figure 6:
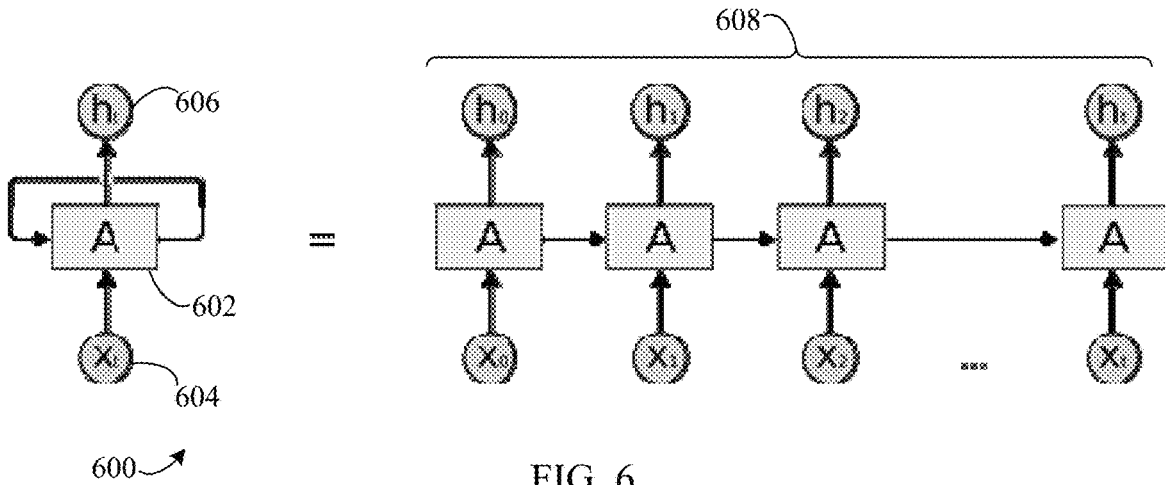
FIG. 6 shows a block diagram of a recurrent neural network, in accordance with an example embodiment.
Figure 7:
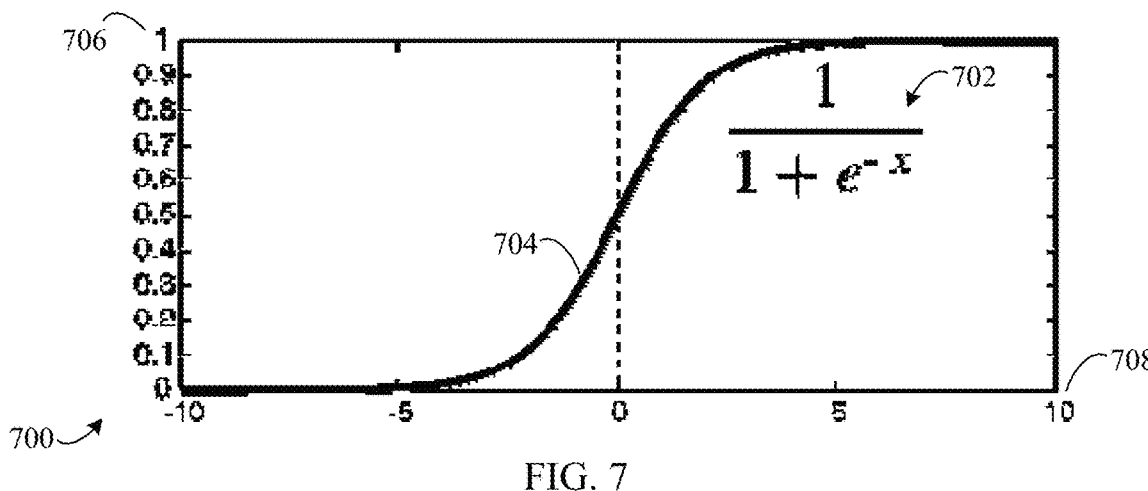
FIG. 7 shows a graph of a soft decision function, in accordance with an example embodiment.
Figure 8:
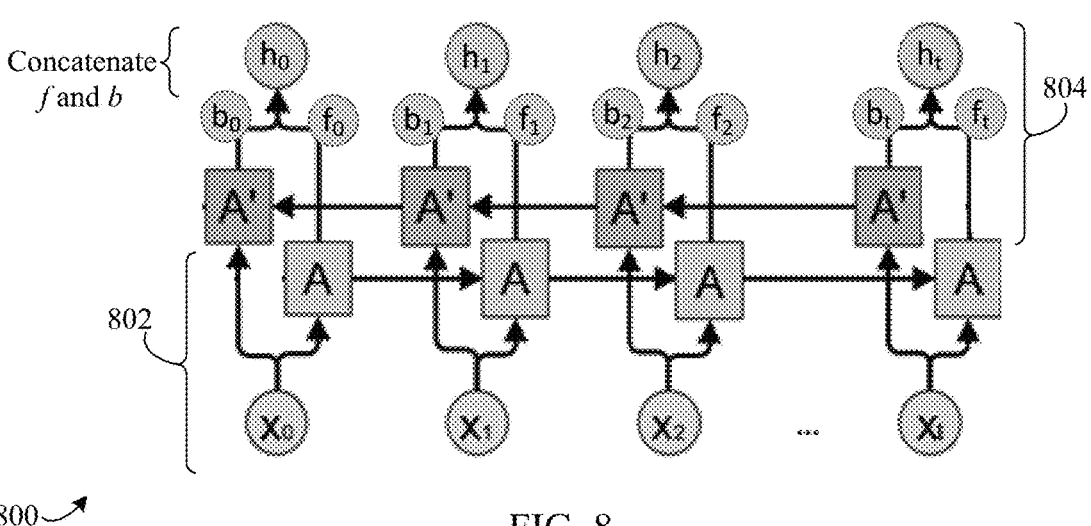
FIG. 8 shows a block diagram of a bi-directional recurrent neural network, in accordance with an example embodiment.

Example embodiments for RNNs and soft decision engines are described in this subsection with respect to FIGS. 6-8.

FIG. 6 shows an example block diagram of an RNN 600. RNN 600 may be an embodiment of an RNN of RNN and soft decision engine 214 of system 200 in FIG. 2. RNN 600 shows a one-directional RNN represented on the left of FIG. 6 by a cell A 602 that takes an input xt 604 and generates an output vector ht 606. On the right of FIG. 6, and expanded representation 608 is shown that is configured to take an input sequence.

With an input sequence {x0, x1, x2, . . . xt} (e.g., a stroke used as part of a handwritten word), where xt includes the x-y coordinates on the canvas of the input interface at respective times 0, 1, 2, . . . t. Thus, a sequence output from RNN 600 may be obtained as: {h0, h1, h2, . . . ht}.

After obtaining the output sequence of RNN 600, this sequence is mapped into single vector h_final. It is contemplated herein that mapping vector h_final may be performed in various ways, including but not limited to, taking the average of h0, h1, h2, . . . ht, only keeping the last output ht and discarding the remaining outputs, etc. The vector h_final will be linearly projected to a real value and then input into a soft decision engine (e.g., a "softmax" operator) such as one of RNN and soft decision engine 214 of system 200 in FIG. 2 to generate the language probability.

FIG. 7 shows an example graph 700 of a soft decision function 702. Graph 700 may be an embodiment of a soft decision engine of RNN and soft decision engine 214 of system 200 in FIG. 2. As shown, soft decision function 702 is:

$$y = \frac{1}{1 + e^{-x}}.\qquad\text{(Equation 3)}$$

Graph 700 includes a value 704 (shown as an output 'y' 706) of soft decision function 702 for an input 'x' 708. It can be seen that this function will map any real value number input 'x' 708 to a probability value between 0 and 1, i.e., output 'y' 706. This probability is interpreted as the language probability, or in other words, the probability that the input sequence belongs to one category or language. If the probability value is subtracted from 1, the result is the probability that the input sequence belongs to another category or language. In a simple case, two categories or languages may be considered, e.g., English and Chinese.

However, soft decision function 702, e.g., the softmax operator, can be extended for multi-category cases as:

$$softmax(z_i) = \frac{\exp(z_i)}{\sum_j \exp(z_j)}.\qquad\text{(Equation 4)}$$

For instance, after obtaining h_final, described above with respect to RNN 600 of FIG. 6, multiple linear projections for h_final may be generated. Each projection, corresponding to zj in Equation 4, is still done by matrix multiplication, where the matrices are trained with training data. Equation 4 may be utilized to calculate the language probability of each category/language. In embodiments, multiple language classifications of the input strokes may be performed accordingly.

Turning now to FIG. 8, an example block diagram of a bi-directional RNN 800 is shown. Bi-directional RNN 800 may be an embodiment of an RNN of RNN and soft decision engine 214 of system 200 in FIG. 2. Bi-directional RNN 800 shows a forward-directional RNN 802 and backward-directional RNN 804.

Forward-directional RNN 802 takes the input sequence {x0, x1, x2, ..., xt} in the same temporal order as described for one-direction RNN 600 above, and generates an output sequence {f0, f1, f2, ... ft}. A backward RNN will take the input sequence {xt, ..., x2, x1, x0} in the reversed temporal order, and generate another output sequence {$_{b0}$, b1, b2, ..., bt}. The final output sequence at each time t, is generated by concatenating two output vectors ft and bt together where:

$$ht=[ft,bt]. \qquad \text{(Equation 5)}$$

Determining the h_final for, and the application of the soft decision engine (for single- and multiple-languages) to, Bi-directional RNN 800 is similarly done as described above with respect to RNN 600 using ht from Equation 5.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including system 100 of FIG. 1, system 200 of FIG. 2, user interface 500 of FIG. 5, RNN 600 of FIG. 6, soft decision engine 700 of FIG. 7, and bi-directional RNN 800 of FIG. 8, along with any components and/or subcomponents thereof, as well as the flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 9:
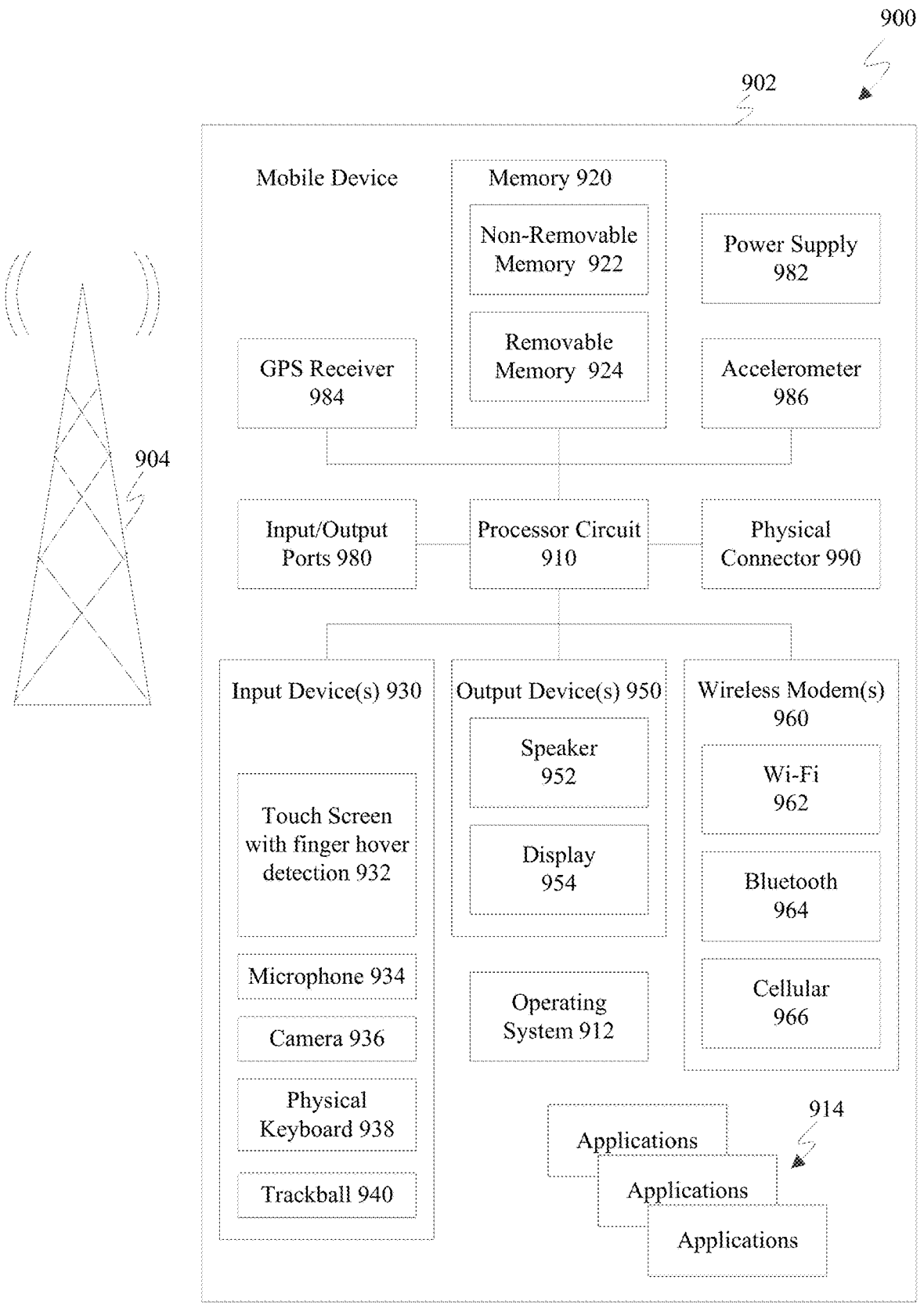
FIG. 9 shows a block diagram of an example mobile device that may be used to implement various example embodiments.

FIG. 9 is a block diagram of an exemplary mobile system 900 that includes a mobile device 902 that may implement embodiments described herein. For example, mobile device 902 may be used to implement any system, client, or device, or components/subcomponents thereof, in the preceding sections. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smart phone, handheld computer, Personal Digital Assistant (PDA), etc.) and can allow wireless two-way communications with one or more mobile communications networks 904, such as a cellular or satellite network, or with a local area or wide area network.

Mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, web browsers, messaging applications) and any other computing applications (e.g., word processing applications, mapping applications, media player applications).

Mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and application programs 914. Example data can include web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing one or more of system 100 of FIG. 1, system 200 of FIG. 2, user interface 500 of FIG. 5, RNN 600 of FIG. 6, soft decision engine 700 of FIG. 7, and bi-directional RNN 800 of FIG. 8, along with any components and/or subcomponents thereof, as well any operations and flowcharts/flow diagrams described herein and/or further examples described herein.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Other possible output devices (not shown) can include piezoelectric or other haptic output devices. Some devices can serve more than one input/output function. For example, touch screen 932 and display 954 can be combined in a single input/output device. Input devices 930 can include a Natural User Interface (NUI).

One or more wireless modems 960 can be coupled to antenna(s) (not shown) and can support two-way communications between processor 910 and external devices, as is well understood in the art. Modem 960 is shown generically and can include a cellular modem 966 for communicating with the mobile communication network 904 and/or other radio-based modems (e.g., Bluetooth 964 and/or Wi-Fi 962). At least one wireless modem 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to implement any of the above-described features of flowcharts/embodiments herein. Computer program logic for performing any of the operations, steps, and/or functions described herein may be stored in memory 920 and executed by processor 910.

Figure 10:
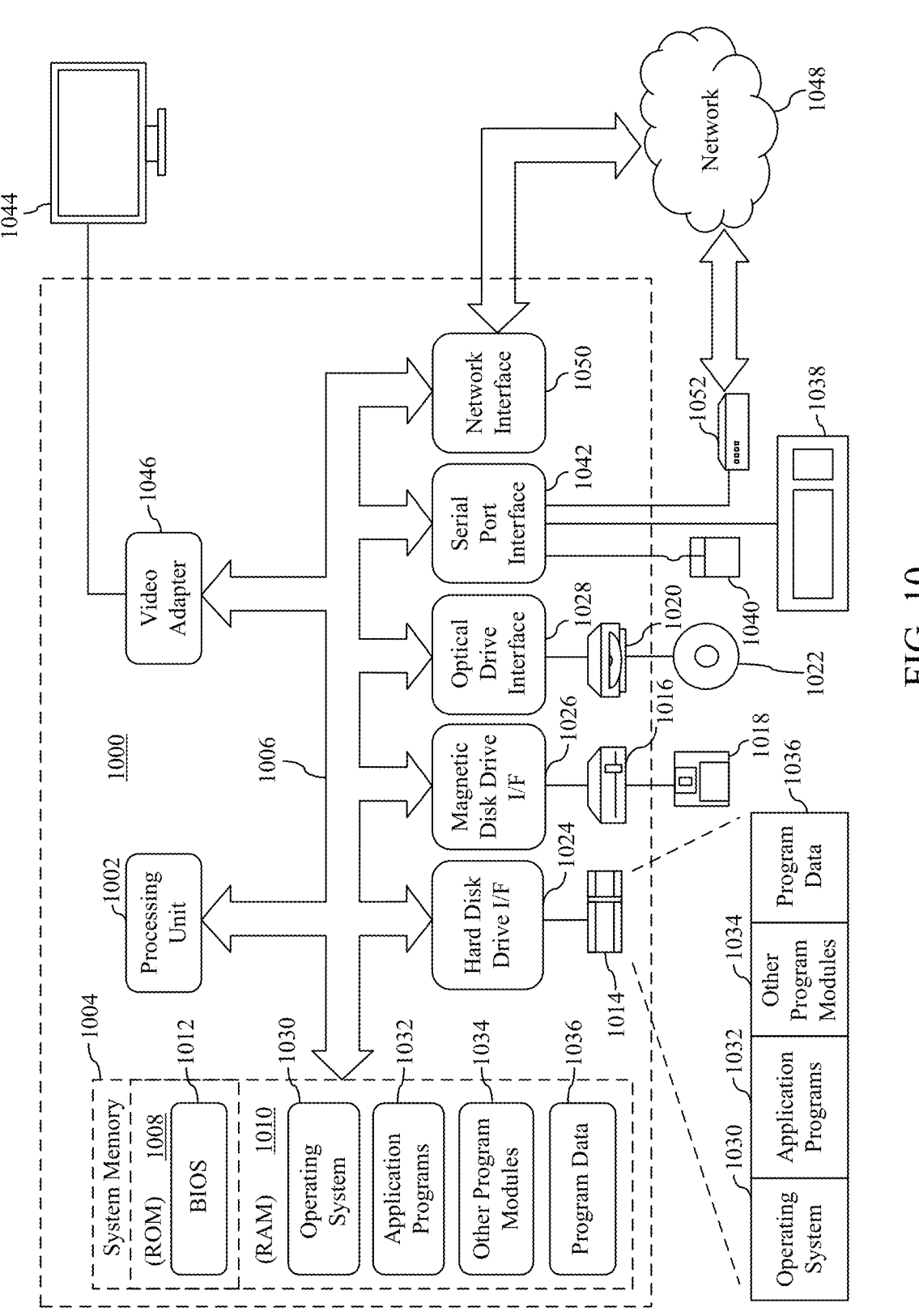
FIG. 10 shows a block diagram of an example computing device that may be used to implement embodiments.

FIG. 10 depicts an exemplary implementation of a computing device 1000 in which embodiments may be implemented. For example, embodiments described herein may be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems and/or game consoles, etc., as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing embodiments described herein, such as system 100 of FIG. 1, system 200 of FIG. 2, user interface 500 of FIG. 5, RNN 600 of FIG. 6, soft decision engine 700 of FIG. 7, and bi-directional RNN 800 of FIG. 8, along with any components and/or subcomponents thereof, as well as the plots and flowcharts/flow diagrams described herein and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium," etc., are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable media and/or computer-readable storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

The disclosed embodiments provide for automatic language detection that is performed prior to sending representations of the handwritten text to a language recognition engine to reduce performance penalties for text translations. That is, by determining specific language recognition engines to be utilized prior to text translation, instead of translating text across multiple engines for each translation, resource utilization, e.g., memory, processor, power, network bandwidth, etc., is greatly reduced. Accordingly, techniques are provided herein for efficient performance of automatic language detection for handwritten text and its translation that allows implementations to be utilized on client and edge devices.

Furthermore, the disclosed embodiments do not exist in software implementations for performing automatic language detection for handwritten text. Current solutions either require that each language recognition engine available simultaneously attempts to recognize handwritten inputs, which is wasteful of and burdensome for system resources, or require that a user manually select between different language packs, which must be downloaded and enabled for each use. The embodiments herein enable automatic language detection for handwritten text to provide a user with the capability to detect languages seamlessly and efficiently, and subsequently translate/transcribe there inputs.

The disclosed embodiments also provide for the capability to utilize groups of handwritten strokes as constructs, based on types of languages, to enable language semantics as indicia for language detection. For example, the input analyzers and RNNs described herein may be adapted to identify and utilize such constructs.

While enabling automatic language detection of handwritten text for client and edge devices, as shown herein, the described embodiments are also adaptable to server- and cloud-based implementations. For instance, substrate application programming interfaces (APIs) are used to make calls from client devices to externally hosted language detection.

For client-side implementations, the described embodiments for language detection of handwritten text may utilize the stock keeping unit (SKU) code of the client device operating system, the keyboard or keypad, and/or the like, to facilitate detection of languages. That is, characteristics and user profile information may be determined from the client device itself and used for language detection, in embodiments.

The additional examples and embodiments described in this Section may be applicable to examples disclosed in any other Section or subsection of this disclosure.

A language detection system is described herein. The language detection system may be configured and enabled in various ways to perform automatic language detection for handwritten inputs, as described herein. The language detection system includes a processing system comprising one or more processors and memory configured to store program code to be executed by the one or more processors. The program code includes an input analyzer configured to receive handwritten inputs from an input interface, the handwritten inputs including one or more writing strokes, associate the handwritten inputs with sets of coordinate-time pairs, and group the handwritten inputs into words based at least on the sets of coordinate-time pairs. The program code also includes a detection manager configured to normalize the one or more writing strokes that correspond to the words to generate normalized words, transform the normalized words individually to generate language vectors for the normalized words, and determine at least one language probability based at least on the language vectors to select a specific language recognition engine. The program code also includes an engine selector configured to provide the handwritten inputs to a specific language recognition engine of a plurality of language recognition engines to determine a language associated with the handwritten inputs.

In an embodiment of the language detection system, the detection manager is configured to analyze the normalized words individually to generate the language vectors for the normalized words using a recurrent neural network (RNN) where the language vectors are outputs of the RNN. In a further embodiment, the RNN is a bi-directional RNN that generates first vectors from a forward portion of the bi-directional RNN and second vectors from a backward portion of the bi-directional RNN, and the detection manager is configured to concatenate the first vectors and the second vectors to generate the language vectors.

In an embodiment of the language detection system, each of the writing strokes includes one or more of the sets of coordinate-time pairs, and the input analyzer is configured to compare spatial and temporal attributes of each of the one or more writing strokes with others of the one or more writing strokes based at least on the one or more sets of coordinate time pairs and to group the handwritten inputs into words based at least on the spatial and temporal attributes. In a further embodiment, the spatial and temporal attributes include at least one of a direction of a successive word with respect to a previous word, amounts of time between the one or more writing strokes, an amount of time taken to complete a writing stroke, or a proximity of a writing stroke to others of the one or more writing strokes.

In an embodiment of the language detection system, the handwritten inputs include handwriting strokes captured in approximately real-time, and wherein the input interface comprises a user interface that is one or more of a touchscreen, a touchpad, or a camera. In an embodiment of the language detection system, the handwritten inputs include a stored representation of handwriting, and wherein the input interface comprises an access interface to a storage where the representation is stored.

In an embodiment of the language detection system, the input analyzer is configured to detect symbols in the handwritten inputs, and provide the detected symbols to a detection manager to determine the at least one language probability.

In an embodiment, the language detection system further includes the specific language recognition engine that is configured to generate a language translation or a transcription of the handwritten inputs, and includes a user interface configured to provide the language translation or the transcription of the handwritten inputs generated by the specific language recognition engine to a user interface of a display.

A computer-implemented method for language detection is described herein. In embodiments, the method includes receiving handwritten inputs from an input interface, the handwritten inputs including one or more writing strokes, and grouping the handwritten inputs into words based at least on sets of coordinate-time pairs for each of the handwritten inputs. The method also includes transforming the words individually to generate language vectors for the words, determining at least one language probability based at least on the language vectors to select a specific language recognition engine, and providing the handwritten inputs to a specific language recognition engine of a plurality of language recognition engines to determine a language associated with the handwritten inputs.

In an embodiment, the method further includes associating the handwritten inputs with the sets of coordinate-time pairs, and normalizing the one or more writing strokes that correspond to writing strokes of the words to generate normalized words.

In an embodiment, the method further includes at least one of analyzing the normalized words individually to generate the language vectors for the normalized words using a RNN where the language vectors are outputs of the RNN, or analyzing the normalized words individually to generate the language vectors for the normalized words using a bi-directional RNN that generates first vectors from a forward portion of the bi-directional RNN and second vectors from a backward portion of the bi-directional RNN, where the first vectors and the second vectors are concatenated to generate the language vectors that are outputs of the RNN.

In an embodiment of the method, each of the writing strokes includes one or more of the sets of coordinate-time pairs. In the embodiment, the method further includes comparing spatial and temporal attributes of each of the one or more writing strokes with others of the one or more writing strokes based at least on the one or more sets of coordinate time pairs, and grouping the handwritten inputs into words based at least on the spatial and temporal attributes. In a further embodiment of the method, the spatial and temporal attributes include at least one of a direction of a successive word with respect to a previous word, amounts of time between the one or more writing strokes, an amount of time taken to complete a writing stroke, or a proximity of a writing stroke to others of the one or more writing strokes.

In an embodiment of the method, the handwritten inputs comprise handwriting strokes captured in approximately real-time, and wherein the input interface comprises a user interface that is one or more of a touchscreen, a touchpad, or a camera, or the handwritten inputs comprise a stored representation of handwriting, and wherein the input interface comprises an access interface to a storage where the representation is stored.

In an embodiment, the method further includes detecting symbols in the handwritten inputs, and providing the detected symbols to a detection manager to determine the at least one language probability.

In an embodiment, the method further includes generating a language translation or a transcription of the handwritten inputs, and providing the language translation or the transcription of the handwritten inputs generated by the specific language recognition engine to a user interface of a display.

In an embodiment of the method, said determining at least one language probability based at least on the language vectors is also based at least on one or more user profile attributes.

A computer-readable storage medium having program instructions recorded thereon that, when executed by a processing device, perform a method for language detection is also described. In an embodiment, the method includes receiving handwritten inputs that include one or more writing strokes, and grouping the handwritten inputs into words based at least on sets of coordinate-time pairs for each of the handwritten inputs. The method also includes transforming the words individually to generate language vectors for the words, determining at least one language probability based at least on the language vectors to select a specific language recognition engine, and providing the handwritten inputs to a specific language recognition engine to determine a language associated with the handwritten inputs.

In an embodiment of the computer-readable storage medium, the method includes comparing spatial and temporal attributes of each of the one or more writing strokes with others of the one or more writing strokes based at least on the one or more sets of coordinate time pairs, grouping the handwritten inputs into words based at least on the spatial and temporal attributes, and analyzing the normalized words individually to generate the language vectors for the normalized words using a bi-directional RNN that generates first vectors from a forward portion of the bi-directional RNN and second vectors from a backward portion of the bi-directional RNN, where the first vectors and the second vectors are concatenated to generate the language vectors that are outputs of the RNN.

In an embodiment of the computer-readable storage medium, the handwritten inputs comprise handwriting strokes captured in approximately real-time, and wherein the input interface comprises a user interface that is one or more of a touchscreen, a touchpad, or a camera, or the handwritten inputs comprise a stored representation of handwriting, and wherein the input interface comprises an access interface to a storage where the representation is stored.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A language detection system comprising:
a processing system comprising one or more processors; and
a memory configured to store program code to be executed by the one or more processors, the program code including:
an input analyzer configured to:
receive handwritten inputs from an input interface, the handwritten inputs including one or more writing strokes;
associate the handwritten inputs with sets of coordinate-time pairs, wherein said sets of coordinate-time pairs represent at least one or more times when the strokes were made; and
group the handwritten inputs into words based at least on the sets of coordinate-time pairs;
a detection manager configured to:
normalize the one or more writing strokes that correspond to the words to generate normalized words;
transform the normalized words individually to generate language vectors for the normalized words; and
determine at least one language probability based at least on the language vectors; and
an engine selector configured to:
select a specific language recognition engine from a plurality of language recognition engines based at least on the at least one language probability; and
provide the handwritten inputs to the selected specific language recognition engine to recognize the handwritten inputs.

2. The language detection system of claim 1, wherein the detection manager is configured to analyze the normalized words individually to generate the language vectors for the normalized words using a recurrent neural network (RNN) where the language vectors are outputs of the RNN.

3. The language detection system of claim 2, wherein the RNN is a bi-directional RNN that generates first vectors from a forward portion of the bi-directional RNN and second vectors from a backward portion of the bi-directional RNN; and
wherein the detection manager is configured to concatenate the first vectors and the second vectors to generate the language vectors.

4. The language detection system of claim 1, wherein each of the writing strokes includes one or more of the sets of coordinate-time pairs; and
wherein the input analyzer is configured to:
compare spatial and temporal attributes of each of the one or more writing strokes with others of the one or more writing strokes based at least on the one or more sets of coordinate time pairs; and
group the handwritten inputs into words based at least on the spatial and temporal attributes.

5. The language detection system of claim 4, wherein the spatial and temporal attributes include at least one of:
a direction of a successive word with respect to a previous word;
amounts of time between the one or more writing strokes;
an amount of time taken to complete a writing stroke; or
a proximity of a writing stroke to others of the one or more writing strokes.

6. The language detection system of claim 1, wherein the handwritten inputs comprise handwriting strokes captured in approximately real-time, and wherein the input interface comprises a user interface that is one or more of a touchscreen, a touchpad, or a camera; or
wherein the handwritten inputs comprise a stored representation of handwriting, and wherein the input interface comprises an access interface to a storage where the representation is stored.

7. The language detection system of claim 1, wherein the input analyzer is configured to:
detect symbols in the handwritten inputs; and
provide the detected symbols to the detection manager to determine the at least one language probability.

8. The language detection system of claim 1, further comprising:
the specific language recognition engine that is configured to:
generate a language translation or a transcription of the handwritten inputs; and
a user interface configured to:
provide the language translation or the transcription of the handwritten inputs generated by the specific language recognition engine to a display.

9. A computer-implemented method for language detection, the method comprising:
receiving handwritten inputs from an input interface, the handwritten inputs including one or more writing strokes;
grouping the handwritten inputs into words based at least on sets of coordinate-time pairs corresponding to the handwritten inputs, wherein said sets of coordinate-time pairs represent at least one or more times when the strokes were made;
transforming the words individually to generate language vectors for the words;
determining at least one language probability based at least on the language vectors;
based at least on the at least one language probability, selecting a specific language recognition engine from a plurality of language recognition engines corresponding to different languages; and
providing the handwritten inputs to the selected specific language recognition engine to recognize the handwritten inputs.

10. The computer-implemented method of claim 9, further comprising:
associating the handwritten inputs with the sets of coordinate-time pairs; and
normalizing the one or more writing strokes that correspond to writing strokes of the words to generate normalized words.

11. The computer-implemented method of claim 9, further comprising at least one of:
analyzing the normalized words individually to generate the language vectors for the normalized words using a recurrent neural network (RNN) where the language vectors are outputs of the RNN; or analyzing the normalized words individually to generate the language vectors for the normalized words using a bi-directional recurrent neural network (RNN) that generates first vectors from a forward portion of the bi-directional RNN and second vectors from a backward portion of the bi-directional RNN, where the first vectors and the second vectors are concatenated to generate the language vectors that are outputs of the RNN.

12. The computer-implemented method of claim 9, wherein each of the writing strokes includes one or more of the sets of coordinate-time pairs, the method further comprising:

comparing spatial and temporal attributes of each of the one or more writing strokes with others of the one or more writing strokes based at least on the one or more sets of coordinate time pairs; and grouping the handwritten inputs into words based at least on the spatial and temporal attributes.

13. The computer-implemented method of claim 12, wherein the spatial and temporal attributes include at least one of:

a direction of a successive word with respect to a previous word;

amounts of time between the one or more writing strokes;

an amount of time taken to complete a writing stroke; or a proximity of a writing stroke to others of the one or more writing strokes.

14. The computer-implemented method of claim 9, wherein the handwritten inputs comprise handwriting strokes captured in approximately real-time, and wherein the input interface comprises a user interface that is one or more of a touchscreen, a touchpad, or a camera; or wherein the handwritten inputs comprise a stored representation of handwriting, and wherein the input interface comprises an access interface to a storage where the representation is stored.

15. The computer-implemented method of claim 9, further comprising:

detecting symbols in the handwritten inputs; and providing the detected symbols to a detection manager to determine the at least one language probability.

16. The computer-implemented method of claim 9, further comprising:

generating a language translation or a transcription of the handwritten inputs; and providing the language translation or the transcription of the handwritten inputs generated by the specific language recognition engine to a user interface of a display.

17. The computer-implemented method of claim 9, wherein said determining at least one language probability based at least on the language vectors is also based at least on one or more user profile attributes.

18. A computer-readable storage medium having program instructions recorded thereon that, when executed by a processing device, perform a method for language detection, the method comprising:

receiving handwritten inputs that include one or more writing strokes;

grouping the handwritten inputs into words based at least on sets of coordinate-time pairs corresponding to the handwritten inputs, wherein said sets of coordinate-time pairs represent at least one or more times when the strokes were made;

transforming the words individually to generate language vectors for the words;

determining at least one language probability based at least on the language vectors;

selecting a specific language recognition engine from a plurality of language recognition engines based at least on the at least one language probability; and providing the handwritten inputs to a specific language recognition engine to recognize the handwritten inputs.

19. The computer-readable storage medium of claim 18, wherein the method further comprises:

comparing spatial and temporal attributes of each of the one or more writing strokes with others of the one or more writing strokes based at least on the one or more sets of coordinate time pairs;

grouping the handwritten inputs into words based at least on the spatial and temporal attributes; and analyzing the normalized words individually to generate the language vectors for the normalized words using a bi-directional recurrent neural network (RNN) that generates first vectors from a forward portion of the bi-directional RNN and second vectors from a backward portion of the bi-directional RNN, where the first vectors and the second vectors are concatenated to generate the language vectors that are outputs of the RNN.

20. The computer-readable storage medium of claim 18, wherein the handwritten inputs comprise handwriting strokes captured in approximately real-time, and wherein the input interface comprises a user interface that is one or more of a touchscreen, a touchpad, or a camera; or wherein the handwritten inputs comprise a stored representation of handwriting, and wherein the input interface comprises an access interface to a storage where the representation is stored.

* * * * *